US008163845B2

(12) United States Patent
Busch et al.

(10) Patent No.: US 8,163,845 B2
(45) Date of Patent: Apr. 24, 2012

(54) BIAXIALLY ORIENTED ELECTRICAL INSULATING FILM

(75) Inventors: Detlef Busch, Saarlouis (DE); Thilo Mohr, Homburg (DE); Joachim Fiebig, St. Marien (AT); Franck Jacobs, Evergern (BE); Yvo Daniels, Zonhofen (BE)

(73) Assignees: Treofan Germany GmbH & Co. KG, Neunkirchen (DE); Borealis Technology Oy, Porvoo (FI)

( * ) Notice: Subject to any disclaimer, the term of this patent is extended or adjusted under 35 U.S.C. 154(b) by 277 days.

(21) Appl. No.: 12/439,215

(22) PCT Filed: Aug. 29, 2007

(86) PCT No.: PCT/EP2007/058986
§ 371 (c)(1),
(2), (4) Date: Feb. 27, 2009

(87) PCT Pub. No.: WO2008/025796
PCT Pub. Date: Mar. 6, 2008

(65) Prior Publication Data
US 2010/0047544 A1  Feb. 25, 2010

(30) Foreign Application Priority Data

Aug. 31, 2006  (EP) .................................... 06119894

(51) Int. Cl.
*C08L 23/00* (2006.01)
*C08L 23/04* (2006.01)
*C08L 23/10* (2006.01)
(52) U.S. Cl. ........................................ 525/191; 525/240
(58) Field of Classification Search .................. 525/191, 525/240
See application file for complete search history.

(56) References Cited

U.S. PATENT DOCUMENTS

| 4,622,237 | A | 11/1986 | Lori |
| 5,252,389 | A | 10/1993 | Schmidt et al. |
| 5,362,808 | A | 11/1994 | Brosius et al. |
| 5,461,119 | A | 10/1995 | Marczinke et al. |
| 6,127,042 | A | 10/2000 | Tamic |
| 2002/0032295 | A1 | 3/2002 | Peiffer et al. |
| 2003/0176555 | A1 | 9/2003 | Watanabe et al. |
| 2004/0171782 | A1 | 9/2004 | Lin et al. |
| 2010/0003489 | A1 * | 1/2010 | Busch et al. .................. 428/220 |

FOREIGN PATENT DOCUMENTS

| DE | 10300146 A1 | 7/2003 |
| EP | 0190889 A2 | 8/1986 |
| EP | 0384431 A2 | 8/1990 |
| EP | 0497160 A1 | 1/1992 |
| EP | 0142724 A2 | 5/1995 |
| EP | 0688817 A1 | 6/1995 |
| EP | 0450342 B1 | 10/1995 |
| EP | 0574801 B1 | 8/1996 |
| EP | 0574804 B1 | 12/1996 |
| EP | 0776926 A2 | 6/1997 |
| EP | 0678527 B1 | 7/1998 |
| EP | 0909638 A2 | 4/1999 |
| EP | 1398344 A1 | 3/2004 |
| WO | WO-97/05634 A1 | 2/1997 |

* cited by examiner

Primary Examiner — Nathan M Nutter
(74) Attorney, Agent, or Firm — Connolly Bove Lodge & Hutz LLP

(57) ABSTRACT

The invention relates to a biaxially oriented electrical insulating film which contains a mixture from a polypropylene P1 and a polypropylene P2 which is different therefrom. The polypropylene P1 is a linear polypropylene and has an Mw/Mn>5 and a mesopentadene isotactic index of at least 95% and the polypropylene P2 has a long-chain branching.

12 Claims, No Drawings

BIAXIALLY ORIENTED ELECTRICAL INSULATING FILM

RELATED APPLICATIONS

This application is a national stage application (under 35 U.S.C. §371) of PCT/EP2007/058986, filed Aug. 29, 2007, which claims benefit of European Application No. 06119894.1, filed Aug. 31, 2006.

The invention concerns a polypropylene film with improved properties for use as an electrically insulating film in condensers.

EP-A-0 776 926 describes a biaxially-oriented film for use in a condenser, which has a total shrinkage of 1-4% at 120° C. in the longitudinal and lateral directions. The film consists of a highly isotactic polypropylene and has an isotacticity of 98-99.5% and an isotactic pentad fraction of >99%.

In WO 97/05634 a condenser is described, which has a dielectric consisting of polypropylene film with an elasticity module of greater than 1500 MPa, a flow temperature of above 110° C. and a vicat softening point of greater than 150° C. The film has, among other things, an improved shrinkage behaviour in the longitudinal direction between 100° C. and 150° C. The shrinkage behaviour in the lateral direction is not described.

EP 1 398 344 A1 describes a method for producing biaxially-oriented polypropylene film. The polypropylene possesses a special melt strength in combination with a selected MFI. inserting the films in the packaging area is described. Other uses are not mentioned.

JP 2006-63186 describes films made of polypropylenes with a narrow molecular weight distribution and high isotacticity. According to this teaching, highly isotactic polypropylenes with a Mw/Mn of <5 are advantageous relative to the temperature stability of the film produced out of them, but the stretchability is difficult because of the increased crystallinity. In order to solve this problem, the highly isotactic polypropylene raw material is mixed with an HMS polypropylene. The advantages of the highly isotactic, narrowly-distributed raw material remain, the stretchability of the mixture is substantially better and the films have a better thickness consistency. Moreover, it is described that the films made of this mixture have a better breakdown voltage.

The electric breakdown voltage is an important quality criterion for the electrical insulation film. The breakdown voltage is the maximum voltage with which the condenser can be loaded. Should the breakdown voltage be reached, then breakdowns occur in the film, breakdowns which adversely affect the capacity and can lead to total failure of the condenser. The maximum electrical breakdown voltage at a given temperature depends on both the film thickness and the temperature stability. The achievable breakdown voltage goes down with increasing temperature. For this reason, condensers are configured to a specific maximum usage temperature, which should not be exceeded. Breakdowns in the condenser can therefore arise due to breakdown voltages when the usage temperature is exceeded. According to the prior art, these deficiencies can only be compensated for by an increase in the film thickness, with which boundaries are set for reduction in the component sizes.

The task of the present invention consisted in producing a biaxially-oriented polypropylene film which contributes towards improved usage properties of the condensers made out of it. In particular, improvement (raising) of the electrical breakdown voltage accompanying a better stability of the condensers are a permanent requirement in the professional world.

In order to produce film condensers, the films are generally initially metallised and subsequently wound. The metallisation of the film itself already includes a temperature load that the film must withstand, i.e. changes to dimensions of the film must not take place during metallisation.

It was found that, in particular in so-called performance condensers for high-voltage uses, extreme temperatures, so-called hot-spot temperatures, can emerge in local areas, locally in the interior of the condenser through flowing currents or discharge processes. In this, according to available investigations, temperatures of clearly over 120° C. up to 140° C. are reached in places. With this, the film is often subjected to increased temperatures both during the handling to the metallised reel and during usage of the condenser.

This object formulated above is achieved according to the invention by a biaxially-oriented electrical insulating film, which contains a mixture of a polypropylene P1 and a different polypropylene P2, wherein the polypropylene P1 is a linear polypropylene and has a Mw/Mn>5 and a mesopentadene fraction of at least 95% and the polypropylene P2 has a long-chain branching.

According to the invention, the film contains a mixture of at least two different polymers P1 and P2 and, if necessary, of conventional additives in small quantities, like for example stabilisers and neutralisation agents. The first component P1 is a polypropylene, which, on account of its particular purity (low ash and chlorine content), is suitable for producing electrical insulating films. This polypropylene is distinguished by a broad molecular weight distribution in combination with a high isotacticity. Structurally, this material has a linear chain structure, as is normally conventional in polypropylenes. The second component is a propylene polymer P2, which is structurally different to P1 and has a long-chain branching.

The film generally contains at least 95-100% by weight, preferably 98 to <100% by weight, in each case relative to the film, or rather the layer, of the polymer mixture. The composition of the mixture can basically vary within a broad range. In general, it is preferred for the polymer P1 to make up the main component of the mixture, i.e. The P1 portion to be >50 to <100% by weight, P2correspondingly <50 to >0% by weight, in each case relative to the weight of the mixture. Mixtures consisting of 70-99% by weight P1 and 1-30% by weight P2, preferably 80-98% by weight P1 and 2-20% by weight P2, are preferred. Mixtures with 90-97% P1 and 3-10% P2 are particularly preferred.

All conventional polypropylene raw materials conventionally used for the production of electrical insulating films can be introduced as propylene polymer raw materials P1 of the mixture, as long as they fulfil the molecular weight distribution with a Mw/Mn>5 and a mesopentadene isotaxy of at least 95%. The propylene polymer P1 contains at least 98 to 100% by weight, in particular 99 to 100% by weight, propylene. The corresponding comonomer content of at least 2% by weight, or rather in particular 0 to 1% by weight consists, if available, in general of ethylene. The figures in % by weight each refer to the propylene polymer, propylene homopolymers are preferred.

The propylene homopolymer P1 has, according to the invention, an Mw/Mn of >5, preferably of >5 to 12, in particular of 5.5 to 10. Mw/Mn is a value for the molecular weight distribution (determined by means of GPC) of the propylene polymers expressed as a ratio of the weight average Mw to the number average Mn. The mesopentadene isotaxy preferably comes to 95-99.8%, in particular 96.5 to 99.5%. Surprisingly, the temperature stability of the breakdown voltage of the films improves through admixture of long-chain branched P2 polymers to a broadly distributed polymer, if the mesopentadene isotaxy of the broadly-distributed polymers P1 has a minimum value of at least 95%. It was originally expected that the broad distribution of the polymer P1 would adversely affect this temperature stability to such an extent that the addition of long-chain branched polymers P2 can no longer compensate for this adverse effect. Surprisingly, the said addition still brings the desired improvement upon admixture with a broadly-distributed polypropylene, if a high isotaxy is given at the same time. If the mesopentadene isotaxy of the broadly-distributed polymer lies under 95%, then no improvement of the breakdown voltage is established by the addition of the long-chain branched polymer P2.

The polypropylene P1 generally has a melting point of 155 to 170° C., preferably of 160 to 167° C., and a melt flow index (measurement ISO 1133 at 2.16kg load and 230° C.) of 0.7 to 15 g/10 min, preferably of 1.0 to 8.0 g/10 min. The n-heptane-soluble portion of the polymer P1 generally comes to 0.2 to 4% by weight, preferably 1 to 2% by weight relative to the output polymer, corresponding to an isotactic portion (wherein for this the n-heptane insoluble portion is adopted as isotactic portion) of 96 to 99.8%, preferably 98 to 99%. The average molecular weight Mw (weight average) of the polymer P1, determined by means of GPC, lies in the range of 200,000 to 800,000, preferably 400,000 to 650,000.

The chain isotaxy index determined by means of $^{13}$C-NMR-spectroscopy (triad method, subsequently called "triad value") of the propylene homopolymers P1 comes to >95%, preferably from >95-99.9%, preferably >97 to 99.5%.

The polymer P1 is structurally different to the polymer P2. It has a linear structure in contrast to the structure with chain branching of polymer P2. Therefore the branching index of P1 g'=1.

With regard to the intended usage aim of the film according to the invention, as condenser film, the propylene homopolymer P1 should have an ash content of <50 ppm, preferably between 10 and 40 ppm, and a chlorine content of at most 10 ppm, preferably >0-5 ppm.

The propylene polymers P2 of the mixture are distinguished by a special long-chain branched structure. The propylene polymer P2 contains at least 98 to 100% by weight, in particular 99 to 100% by weight, propylene units. The corresponding comonomer of at most 2% by weight, or rather in particular 0 to 1% by weight consists, if available, in general of ethylene units. The figures in % by weight each relate to the propylene polymers, propylene homopolymers are preferred.

The propylene polymer P2 generally has a melting point of 155 to 170° C., preferably of 160 to 167° C., and a melt flow index (measurement ISO 1133 at 2.16kg load and 230° C.) of 0.7 to 20 g/10 min, preferably of 1.5 to 15 g/10 min. The n-heptane-soluble portion generally comes to 1 to 3% by weight, preferably 1 to 2% by weight relative to the output polymer, corresponding to an isotactic portion of 97 to 99% by weight, preferably 98 to 99% by weight. The average molecular weight Mw (weight average) of the P2, determined by means of GPC, lies in the range of 200,000 and 800,000, preferably 400,000 to 650,000. The molecular weight distribution (determined by means of GPC) of the propylene polymers P2, expressed as the ratio of the weight average Mw to number average Mn, generally lies between 2 and 11, preferably between 5 and 10.

The chain isotaxy index determined by means of $^{13}$C-NMR spectroscopy (triad method, henceforth "triad value") of the propylene polymer P2 comes to at least 92 to 99%, preferably 93 to 98%. So for the aims of the invention, both high-isotactic propylene polymer P2 with a triad value of 95-99%, and propylene polymers with lower isotaxy values, in which the triad value lies in the range of 92-<95%, can be introduced.

With regard to the intended usage aim of the film according to the invention, as a condenser, the propylene P2 should also have an ash content of <50 ppm, preferably between 10 and 40 ppm, and a chlorine content of at most 10 ppm, preferably >0-5 ppm, wherein if necessary higher impurities can also be accepted, if P2 is added in comparably small quantities. Basically, the impurities of the individual components should be such that the mixture of P1 and P2 does not exceed the named upper limits for ash content of <50 ppm and chlorine content of at most 10 ppm.

According to the invention, long-chain P2 is characterised by a special structure, i.e. is has long-chain branchings. The degree of the branching is determined by use of the weight-average branching index g' of the branched polymer. The weight-average branching index g' is defined as $g'=[IV]_{br}/[IV]_{lin}|M_w$, wherein g' stands for the weight-average branching index, $[IV]_{br}$ for the border viscosity of the branched polypropylene and $[IV]_{lin}$ for the border viscosity of the linear polypropylene with the same weight-average molecular weight as the branched polypropylene. In the art it is well known that with decreasing g'-value the branching increases. See B. H. Zimm and W. H. Stockmayer, J. Chem. Phys. 17, 1301 (1949).

As a rule, the branching index g' of the propylene polymer P2 used for the present invention lies in the range of 0.6 to 0.9. The branching index g' of the propylene polymer P2 used for the film according to the invention preferably comes to less than 0.88, particularly preferably to less than 0.85 and especially particularly preferably to less than 0.80.

Production of propylene polymers P2 with g'≦0.90.

The propylene polymers P2 can be obtained according to a list of methods, e.g. by treatment of the linear propylene polymer with thermally decomposed radical formers and/or by treatment with ionised radiation, wherein both methods can be accompanied or followed by treatment with bi- or multi-functional ethylenically unsaturated monomers, e.g. butadiene, isoprene, dimethylbutadiene, divinylbenzene or trivinylbenzene. Further methods can be suitable for the production of the propylene polymer P2, provided that the propylene polymer P2 possesses the properties required regarding g'. Long-chain branched polypropylene can also be obtained by polymerisation by use of metallocene catalysts.

Within the scope of the present invention, "bi-functional ethylenically unsaturated" or "bi-functional" is to be understood as the presence of two non-aromatic double bonds, like e.g. in divinyl benzene or cyclopentadiene. Only such bi-functional ethylenically unsaturated compounds are used as can be polymerised with the help of free radicals. The bi-functional, unsaturated monomer is not really "unsaturated" in its chemically-bonded condition, as both double bonds are used for a covalent bond to the polymer chains of the linear polypropylene.

Particular examples of methods with which propylene polymers with g'≦0.90 can be obtained, are:

by conversion with polypropylenes (EP 0 574 801 and EP 0 574 804) modified by bismaleic inimido compounds in the melts by conversion with polypropylene modified by ionised radiation (EP 0 190 889 A2)

by treatment with peroxides in solid phase (EP 0 384 431 A2), or rather polypropylenes modified in the melts (EP 0 142 724 A2)

by treatment with bi-functional, ethylenically unsaturated monomers under the effect of polypropylenes modified by ionised radiation (EP 0 678 527)

by treatment with bi-functional ethylenically unsaturated monomers in the presence of peroxides polypropylenes modified in the melts (EP 0 688 817 and EP 0 450 342).

As a rule, propylene polymers P2 with long-chain branchings are produced based on linear propylene polymers.

According to a preferred embodiment, the production of the propylene polymer with long-chain branchings is preferably carried out by mixing the linear propylene polymer in particle form, with an effective quantity of an organic peroxide at a temperature of 30-100° C. The peroxide must be decomposable at high temperatures and serves as a radical former. Preferred peroxides are acryl peroxides, alkyl peroxides, hydroperoxides, peresters and/or peroxycarbonates.

The peroxides can be added in pure form in solution in an organic solvent or in the form of a master batch. The peroxide quantity preferably comes to 0.05 to 3% by weight relative to the weight of the polymer.

Volatile, bi-functional, ethylenically unsaturated monomers are absorbed by the particle-shaped polymer out of the gas phase at temperatures of 20-120° C. and preferably of 70-90° C. The quantity of bi-functional, unsaturated monomers preferably comes to 0.01 to 10% by weight, and particularly preferably to 0.05 to 2% by weight relative to the weight of the polymer.

The mixture containing the peroxide and the bi-functional monomers is heated to a temperature of up to 210° C. and melted on, preferably in an atmosphere containing inert gas and/or volatile, bi-functional monomer. The peroxide decomposes, and reactions take place between the radicals arising, the polymer chains and the bi-functional monomers.

Finally, the melts are heated to 220-250° C. for removal of non-converted monomers and decomposition products. The heating and melting-on steps are preferably carried out in continuously-working kneaders or extruders, preferably in twin-screw extruders.

The molten propylene polymer with long-chain branchings is then cooled off and granulated.

The average sorption time of the volatile bi-functional monomers on the particle-shaped polymer advantageously comes to 10 to 1000 seconds, preferably 20 to 800 seconds and particularly preferably 60 to 600 seconds.

Examples of suitable organic peroxides are:

acryl peroxides like benzene peroxide, 4-chlorobenzene peroxide, 3-methoxybenzoyl peroxide and/or methylbenzoyl peroxide;

alkyl peroxides, like allyl-tert-butyl peroxide, 2,2-bis(tert-butylperoxybutane), 1,1-bis-(tert-butylperoxy)-3,3,5-trimethylcyclohexane, n-buty-4,4-bis(tert-butylperoxy)valerate, diisopropylaminomethyl-tert-amylperoxide, dimethylaminomethyl-tert-amylperoxide, diethylaminomethyl-tert-butylperoxide, dimethylaminomethyl-tert-butylperoxide, 1,1-di(tert-amylperoxy)cyclohexane, tert-amyiperoxide, tert-butylcumylperoxide, tert-butylperoxide, and/or 1-hydroxybutyl-n-butylperoxide.

peresters and peroxycarbonates, like butylperacetate, cumylperacetate, cumylperpropionate, cyclohexylperacetate, di-tert-butylperadipate, di-tert- butylpersebazate, 4-nitrocumylperpropionate, 1-phenylethyl perbenzoate, phenylethylnitroperbenzoate, tert-butylbicyclo- (2,2,1) heptanepercarboxylate, tert-butyl-4-carbomethoxyperbutyrate, tert-buylcyclobutaneper carboxylate, tert-butyl cyclohexylperoxy carboxylate, tert-butylcyclopentylper carboxylate, tert- butylcyclopropaneper carboxylate, tert-butyldimethylpercinnamate, tert-butyl-2-(2,2-diphenylvinyl)perbenzoate, tert-butyl-4-methoxyperbenzoate, tert-butylperbenzoate, tert-butylcarboxycyclohexane, tert-butylpernaphthoate, tert-butylperoxyisopropylcarbonate, tert-butylpertoluate, tert-butyl-1-phenylcyclopropylpercarboxylate, tert-butyl-2-propylperpentene-2-oate, tert-butyl-1-methylcyclopropylpercarboxylate, tert-butyl-4-nitrophenylperacetate, tert-butylnitrophenylperoxycarbamate, tert-butyl-N-succinimidopercarboxylate, tert-butylperoxyisopropylcarbonate, tert-butylperisobutyrate, tert-butylperacrylate and/or tert-buthylperproprionate;

and mixture of these peroxides.

Volatile, bi-functional monomers, which are preferably used for the production of the propylene polymer with long-chain branchings, are among other:

divinyl compounds, like divinylaniline, m-divinylbenzene, p-divinylbenzene, divinylpentane and/or divinylpropane;

allyl compounds, like allylacrylate, allylmethacrylate, allylmethylmaleate and/or allylvinylether;

Dienes, like butadiene, chloroprene, cyclohexadiene, cyclopentadiene, 2,3-dimethylbutadiene, heptadiene, hexadiene, isoprene and/or 1,4-pentadiene;

and mixtures of these monomers.

Particularly preferred are butadiene, isoprene, dimethylbutadiene and divinylbenzene.

Within the scope of the present invention, it was found that the admixture of the polymer P2 into the polymer P1 surprisingly contributed to an improvement in the electrical breakdown voltage of the electrical insulating film, although the polymer P1 has a comparably broad molecular weight distribution. Films made of the polymer mixture according to the invention are excellently suitable as condenser films. In comparison with known condenser films made of conventional polypropylene, the films according to the invention made of the mixture described above show a higher electrical breakdown voltage, which also remains very stable at raised temperatures and is clearly higher than in the condenser films according to the prior art.

The film generally contains 95-100% by weight of the mixture described above, in particular 98-<100% by weight, in each case relative to the weight of the film, as well as, if necessary, conventional additives each in effective quantities, for example neutralisation agents and stabilisers. Additives which are conventional in the packaging film sector, like anti-blocking agents, static inhibitors, lubricants and pigments, are generally not added with regard to their use as condenser films.

The compounds with a stabilising effect can be used as stabilisers for ethylene, propylene and other α-olefin polymers. Their additional quantity lies between 0.05 and 2% by weight. Phenolic stabilisers, alkali/earth alkali stearates and/or alkali/earth alkali carbonates are particularly suitable. Phenolic stabilisers are preferred in a quantity of 0.05 to 0.6% by weight, in particular 0.1 to 0.5% by weight, and with a molar mass of more than 500 g/mol. Pentaerythiry-tetrakis-3-(3,5-di-tertiarybutyl-4-hydroxy-phenyl)-propionate (Irganox 1010) or 1,3,5-trimethyl-2,4,6-tris(3,5-di-tertiarybutyl-4-hydroxybenzyl)benzene (Irganox 1330) or 3,5-di-tert-butyl-4-hydroxytoluol (BHT) are particularly advantageous.

Neutralisation agent is preferably calcium stearate, wherein if necessary other conventional neutralisation agents, which do not adversely affect the dielectric properties of the film, are also introduced. Neutralisation agents are generally added in a quantity of 0.001 to 0.5% by weight, preferably between 0.005 and 0.1% by weight. The figures in % by weight each refer to the weight of the base layer.

The total thickness of the polypropylene film according to the invention can vary within broad limits and depends on the intended use. It preferably comes to 1 to 20 μm, preferably 2.5 to 15 μm. It was found that the thinnest films which could be produced from the mixtures according to the invention were those with thicknesses of <5 μm, preferably <3 μm. The improved breakdown voltage makes it possible for the thickness of the film to be further reduced with a constant electric capacitance. With this, the miniturisation of condenser components is further encouraged. In uses with conventional thicknesses, the increased breakdown voltage likewise offers important advantages.

The invention furthermore concerns a method for the production of polypropylene films according to the invention according to extrusion methods known in themselves.

Within the scope of this method the procedure is that the melt(s) corresponding to the film is/are coextruded through a flat die, the film obtained in that way is pulled off for hardening on one or several roller(s), the film is subsequently biaxially stretched (oriented), the biaxially-stretched film is heat-set and, if necessary, corona- or flame-treated on the surface layer(s) provided for metallisation.

The biaxial stretching (orientation) is generally carried out sequentially, wherein the sequential biaxial stretching, in which the stretching is carried out at first longitudinally (in the machine direction) and then laterally (perpendicular to the machine direction), is preferred. A simultaneous stretching in the longitudinal and the lateral direction is basically also possible.

Initially, as is conventional in extrusion methods, the polymer, or rather the polymer mixture, is compressed and liquefied in an extruder, wherein the additives, added if necessary, can already be contained in the polymer or poymer mixture. The melts are then pressed through a flat die (sheet extrusion die), and the film pressed out is pulled out on one or several outfeed rollers, wherein it cools off and hardens.

The film so obtained is then stretched longitudinally and laterally to the direction of extrusion, leading to an orientation of the molecular chains. The longitudinal stretching will be carried out advantageously with the help of two rollers running at different speeds corresponding to the desired stretch ratio, and the lateral stretching lateral stretching with the help of a corresponding clip frame. The longitudinal stretch ratios lie in the range from 3.0 to 8.0, preferably 4.0 to 6.5. The lateral stretch ratios lie in the range from 6.0 to 10.0, preferably between 7 and 9.5.

Following on from the biaxial stretching is its heat setting (heat treatment), wherein the film is held around 0.1 to 10 s long at a temperature of 100 to 160° C. Subsequently, the film is wound up in the conventional manner with a winding device.

It has proved particularly useful for the outfeed roller or rollers, through which the film pressed out is cooled off and hardened, to be held at a temperature of 30 to 120° C., preferably between 60 and 100° C., by a heating and cooling circuit. The increased outfeed roller temperatures promote the formation of β spherulites in the prefilm. These β spherulites generate the desired surface roughness for the condenser film required for the method, as is described in EP-A-0 497 160.

Before the prefilm is cooled off is fed into the longitudinal stretching unit, it is conventionally pre-heated to a temperature of 110-160° C., preferably to 120-150° C. This preheating can be carried out by means of heated rollers, basically however also with other established methods, like for example IR radiators, heated air etc.

The temperatures at which longitudinal and lateral stretching is carried put depend on the desired properties, in particular on the surface roughness of the film to be generated. In general, the longitudinal stretching is carried out at 120 to 160° C., preferably 130-160° C., and the lateral stretching at 140 to 180° C., preferably 150-170° C.

Preferably, after biaxial stretching one or both surfaces of the film is/are corona-, plasma- or flame-treated according to one of the known methods. The treatment intensity generally lies in the range from 34 to 50 mN/m, preferably 36 to 45 mN/m.

In the corona treatment, the advantageous procedure is for the film to be fed between conducting elements acting as electrodes, wherein a voltage, mostly an alternating voltage (somewhere between 5 to 20 kV and 5 to 30 kHz), is applied between the electrodes which so high enough that spray or corona discharges could take place. AS a result of the spray or corona discharge, the air above the film surface is ionised and reacts with the molecules of the film surface, so that polar buildups arise in the essentially non-polar polymer matrix.

For a flame treatment with polarised flame (cf. U.S. Pat. No. 4,622,237), an electric direct voltage is applied between a burner (negative pole) and a cooling roller. The level of the voltage applied comes to between 400 and 3000V, it preferably leis in the range from 500 to 2000V. The ionised atoms gain increased acceleration through the voltage applied, and collide with the polymer surface with larger kinetic energy. The chemical bonds within the polymer molecule are easier broken up, and the radical formation takes place faster. The thermal load of the polymer is hereby much smaller than in the standard flame treatment without application of a voltage, which is also suitable for the pretreatment of the surface.

The following measuring methods were used for characterisation of the raw materials and the film:

Melt Flow Index

The melt flow index was measured according to ISO 1133 at 2.16 kg load and 230° C.

Melting Point

DSC measurement, maximum of the melt curve, heating speed 10 K/min.

Shrinkage:

The longitudinal and lateral shrinkage values relate to the particular extension in length of the film (longitudinal $L_0$ and lateral $Q_0$) before the shrinking process. The longitudinal direction is the machine direction, the lateral direction is correspondingly defined as the direction perpendicular to the machine direction. The test body of $10*10$ cm$^2$ is shrunk in a circulating air oven at the particular temperature (from 100 to 140° C.) over a period of 15 min. Subsequently, the remaining extensions in length of the test body longitudinally and laterally are determined once again ($L_1$ and $Q_1$). The shrinkage in % is then given as the difference of the extensions in length as a ratio of the original lengths $L_0$ and $Q_0$ times 100.

Longitudinal shrinkage $L_S [\%] = (L_0 - L_1)/L_0 * 100 [\%]$

Lateral shrinkage $Q_S [\%] = (Q_0 - Q_1)/Q_0 * 100 [\%]$

This method of determination for the longitudinal and lateral shrinkage corresponds to DIN 40634.

Dielectric Loss Factor:

Measurement of the dielectric loss factor (tan α) is carried out according to VDE 0303, part 4. The film tests are metallised on both sides with aluminium in a vacuum metallisation device before measurement. The size of the measuring surface F (=metallised surface) depends on the film thickness d:

For a film thickness d of ≦10 μm a surface of 1 cm$^2$

For a film thickness d of >10 μm a surface of 5 cm$^2$

A double determination is carried out on each of the examples to be tested, and the average value calculated. The tests are laid in a drying cupboard. The lower electrode plate consists of brass. The upper electrode is cylindrical and likewise consists of brass. The test voltage comes to 1V. The measurement is carried out at three frequencies of 0.1 Khz, 1 Khz and 10 Khz.

Residual Ash Content:

For measurement of the residual ash content, the portion of non-combustible fillers is determined quantitatively. The residual ash content (loss at ignition) is calculated from the output weight of the sample and the ignition residue. The measured result is given in ppm. A representative control sample of approx. 1 kg is taken from the material to be tested (granulate, regenerate etc.). The material must be clean and completely dry; pre-drying at approx. 80° C. in the circulating air oven is possible required. Three empty porcelain crucibles are heated for at least 1 hour at a temperature of 650° C. in the crucible furnace and, after cooling off in the desiccator to room temperature, weighed to within 0.1 mg accuracy. The heating is repeated until constant weight is achieved between two weighings in a row. Afterwards, 50 g (±0.1 g) of material is weighed in every crucible and then put into the 650° C. muffel furnace. The temperature in the oven is now brought up to 1000° C. and heating is carried out at this temperature for at least 1 h. After the crucible is cooled off in the desiccator, this is weight to within 0.1 mg accuracy. The ash content is given in the unit of measurement ppm (parts per million)=mg/m$^3$. All three crucibles are evaluated according to the following formula, and the two closest values are combined to an average value:

ppm=output weight (g)/input weight (g)×1 000 000

Chlorine Content

The chlorine content in polyolefins is measured quantitatively by means of radiographic fluorescence analysis (RFA) according to DIN 51 001, part 1. A tablet is pressed out of granulate/powder, one which is calibrated with the RFA against a calibration curve. The calibration curve is set up with the help of 10 calibration samples, in which the chlorine content is determined according to an independent method (wet technical). (Values for the chlorine content of under 5ppm are not given numerically for reasons of precision, value <5 ppm).

Boundary Viscosity

Determination of the boundary viscosity was carried out according to ISO 1628-3 in dekalin at 135° C.

Determination of Molecular Weight

The average molar mass and the average molar mass dispersity were determined relying on DIN 55 672, part 1, by means of gel permeation chromatography. Instead of THF, orthodichlorobenzene was used as the elution agent. As the homopolymers to be investigated are not soluble at room temperature, the total measurement is carried out at a raised temperature (at 135° C.).

Isotactic Portion

The isotactic portion of the homopolymer can be characterised approximately by the insoluble fraction of the raw material in n-heptane. Conventionally, a soxlet-extraction is carried out with boiling n-heptane, wherein it is advantageous to fill the soxlet with a pressing instead of granulate. The thickness of the pressing should hereby not exceed 500 micrometers. It is of decisive importance to the quantitative establishment of the n-heptane insoluble portion of the homopolymer to ensure a sufficient extraction time of 8 to 24 hours.

The operational definition of the isotactic portion $PP_{iso}$ in percent is given by the ratio of the weights of the dried n-heptane insoluble fraction to the input weights:

$PP_{iso}$=100×(n-heptane insoluble fraction/input weight)

An analysis of the dried n-heptane extract shows that this does not, as a rule, consist of purely atactic propylene homopolymers. Upon extraction, aliphatic and olefinic oligomers, in particular isotactic oligomers as well as possible additives like e.g. hydrated hydrocarbon resin and wax, are also established as well.

Determination of the Triad-Related Chain Isotaxy Index II (Triads)

Sample Preparation and Measurements 60 to 100 mg of polypropylene were weighed in 10 mm-NMR-test tubes. After addition of a solvent mixture made of hexachlorobutadiene ($C_4Cl_6$) and deuterated tetrachloroethane ($C_2D_2Cl_4$), the suspension is maintained at approx. 140° C. for as long as it takes for a homogeneous solution to emerge. The dissolving method is accelerated by stirring with a glass rod. Taking the $^{13}$C-NMR-spectrum is carried out at increased temperature (as a rule, 373K) under standard measuring conditions (half-quantitative).

Evaluation of the $^{13}$C-NMR-Spectrum

For the description of the configuration statistics (clock time) of polypropylene, three monomer units are combined to triads. In a triad, the configuration of the neighbouring methyl groups is observed from the middle methyl group outwards. If all three methyl groups have the same configuration, then it is an mm-triad.

If the configuration of the previous and the following methyl groups is the same, but different to the middle $CH_3$ group, then it is an rr-triad.

Two further arrangements are possible, mr and rm. However, they cannot be distinguished, as both directions along the polymer chain are of equal value. They are combined as mr-triads.

The various triads can be distinguished by their different chemical displacement in the $^{13}$C-NMR spectrum.

Range of the mm-triads approx. 20.8-approx. 22.2 ppm

Range of the mr-triads approx. 20.0-approx. 20.8 ppm

Range of the rr-triads approx. 19.2-approx. 20.0 ppm

The intensities of the triad signals are compared for calculation of the so-called triad-related chain isotaxy index II:

$II$ (triads)=($I$ mm+0.5 mr)/($I$ mm+mr+$I$ rr)*100

Wherein I mm, I mr and I rr are the integrals of the allocated signal groups.

References:

*NMR-spectroscopy and polymer microstructure* by Alan E. Tonelli, 1989, VCH

Determination of the Mesopentadene Isotaxy (also Called Mesopentadene Fraction (mmmm))

Determination of the mesopentadene isotaxy is carried out as in the following publications: T. Hayashi, Y. Inoue, R. Chujo and T, Asakura, Polymer 29 138-43 (1988), as well as Chujo R, et al, Polymer 35 339 (1994). The $C^{13}$ NMR specra were measured with a Bruker 400 MHz spectrometer at 130° C. The samples were dissolved in 1,2,4-trichlorobenzene/benzene-D6 (90/10 w/w).

The invention is now described on the basis of the following exemplary embodiments:

EXAMPLE 1

A transparent, single-layer film with a total thickness of 7.0 μm was produced by extrusion and subsequent stepwise orientation in the longitudinal and lateral directions. The layer had the following composition:

approx. 95% by weight high-isotactic polypropylene P1 from the Borealis company (name: Borcelan® HB 300Bf)

approx. 5% by weight P2 (HMS)

0.45% by weight phenolic stabiliser Irganox 1010

0.0075% by weight neutralisation agent Ca stearate.

The high-isotactic polypropylene P1 had a mesopentadene isotaxy (mmmm), measured by means of $^{13}$C-NMR-spectroscopy, of 97.4, a chlorine content of <5ppm and an ash content of 20 ppm. The n-heptane insoluble portion of the polypropylene came to 1.7% (isotactic portion PP iso 98.3%). The average molecular weight Mn came to 64,600 g/mol and Mw 392,150 g/mol (measured by means of GPC) corresponding to a molecular weight distribution Mw/Mn of 6.07. The melt flow index MFI (230° C. and 2.16 kp) came to 1.45 g/10 min and the melting point 165° C.

Production of propylene polymer P2 with branching index ≦0.90

In a first step, a linear propylene polymer is produced in a single-stage propylene polymerisation in a loop-type bubble column. A Ziegler-Natta catalyst is used; the reaction temperature comes to 70° C. The concentration of propylene and hydrogen was chosen so that an $MFI_{230/2.16}$ of 5.0 g/10 min resulted.

Powder obtained from the above polymerisation method is loaded at 100° C. for 15 minutes with 0.25% by weight tert-butylperoxyisopropylcarbonate and 0.5% by weight butadiene. The mixture is heated to a temperature of 200° C. in an inert atmosphere (nitrogen) and then further heated to 230° C. and then granulated. The polymer P2 obtained shows an $MFI_{230/2.16}$ of 7.2 g/10 min and a branching index g' of 0.8.

The production conditions in the individual methodological steps for production of the biaxially-oriented film were:
Extrusion: temperatures 250° C.
Temperature of the Outfeed Roller: 86° C.
Longitudinal Stretching: Preheating Temperature: 136° C.
Longitudinal Stretching Temperature: 148° C.
Longitudinal Stretch Ratio: 5.0
Lateral Stretching: Temperature: 163° C.
Lateral Stretch Ratio: 9.6
Setting: Temperature: 130° C.
Convergence: 12.5%

The lateral stretch ratio given is an effective value. This effective value can be calculated from the end film area, reduced by twice the edge band width, divided by the width of the longitudinally-stretched film, which is likewise reduced by twice the edge band width.

EXAMPLE 2

A film was produced as described in example 1. Only the composition of the layer was changed. The portion of P2 was increased to 10% by weight relative to the layer, the P1 portion correspondingly came to 90% by weight. The conditions on production of the film were not changed.

COMPARATIVE EXAMPLE 1

A film was produced as described in example 1. Only the composition of the layer was changed. The layer now consisted only of the high-isotactic polypropylene P1 with stabiliser and neutralisation agent. The conditions upon production of the film were not changed.

COMPARATIVE EXAMPLE 2

A film was produced as described in example 1. Instead of the high-isotactic polypropylene P1 with a Mw/Mn of 6.07, a polypropylene with a mesopentadene isotaxy of approx. 93% and a Mw/Mn of approx. 6. The quantity ratios of the components P1 and P2 were not changed. The conditions upon production of the film were likewise not changed.

TABLE 1

| | BDV in V/μm | | | | | |
|---|---|---|---|---|---|---|
| | Example 1 | | Example 2 | | Comparative example | |
| Voltage temperature | Alternating voltage | Direct voltage | Alternating voltage | Direct voltage | Alternating voltage | Direct voltage |
| 23° C. | 550 | 855 | 537 | 825 | 459 | 835 |
| 100° C. | 514 | 813 | 415 | 746 | 374 | 664 |
| 125° C. | 356 | 734 | | | 310 | 615 |

Unrecognised Text

The invention claimed is:

1. A biaxially-oriented electrical insulating film comprising a mixture of a polypropylene P1 and a different polypropylene P2, wherein said polypropylene P1 is a linear polypropylene and has a Mw/Mn>5 and a mesopentadene isotaxy of at least 95% and said polypropylene P2 has a long-chain branching.

2. The biaxially-oriented electrical insulating film of claim 1, wherein the branching index g' of said polypropylene P2 is in the range of from 0.6 to 0.9.

3. The biaxially-oriented electrical insulating film of claim 1, wherein said film comprises from 95 to 100% of said mixture.

4. The biaxially-oriented electrical insulating film of claim 1, wherein said mixture comprises from 50 to less than 100% by weight of said polypropylene P1 and up to 50% by weight of said polypropylene P2.

5. The biaxially-oriented electrical insulating film of claim 4, wherein said mixture comprises from 70 to 99% by weight of said polypropylene P1 and from 1 to 30% by weight of said polypropylene P2.

6. The biaxially-oriented electrical insulating film of claim 1, wherein said polypropylene P1 has a chain isotaxy index of greater than 95%.

7. The biaxially-oriented electrical insulating film of claim 6, wherein said polypropylene P1 has a chain isotaxy index in the range of from 95% to 99.9%.

8. The biaxially-oriented electrical insulating film of claim 1, wherein said mixture has an ash content of less than 50 ppm and a chlorine content of no more than 10 ppm.

9. The biaxially-oriented electrical insulating film of claim 8, wherein said mixture has an ash content in the range of from 10 to 40 ppm and a chlorine content of up to 5 ppm.

10. The biaxially-oriented electrical insulating film of claim 1, wherein said film is metallised on the surface of one or both of its sides.

11. The biaxially-oriented electrical insulating film of claim 1, wherein said film has a thickness of no more than 20 μm.

12. A condenser comprising the biaxially-oriented electrical insulating film of claim 1.

* * * * *